Feb. 10, 1948. R. T. COLLIER ET AL 2,435,710
METHOD OF PRODUCING SULFUR DIOXIDE FROM WASTE SULFURIC
ACID-HYDROCARBON CONTAINING MATERIAL
Filed April 28, 1945
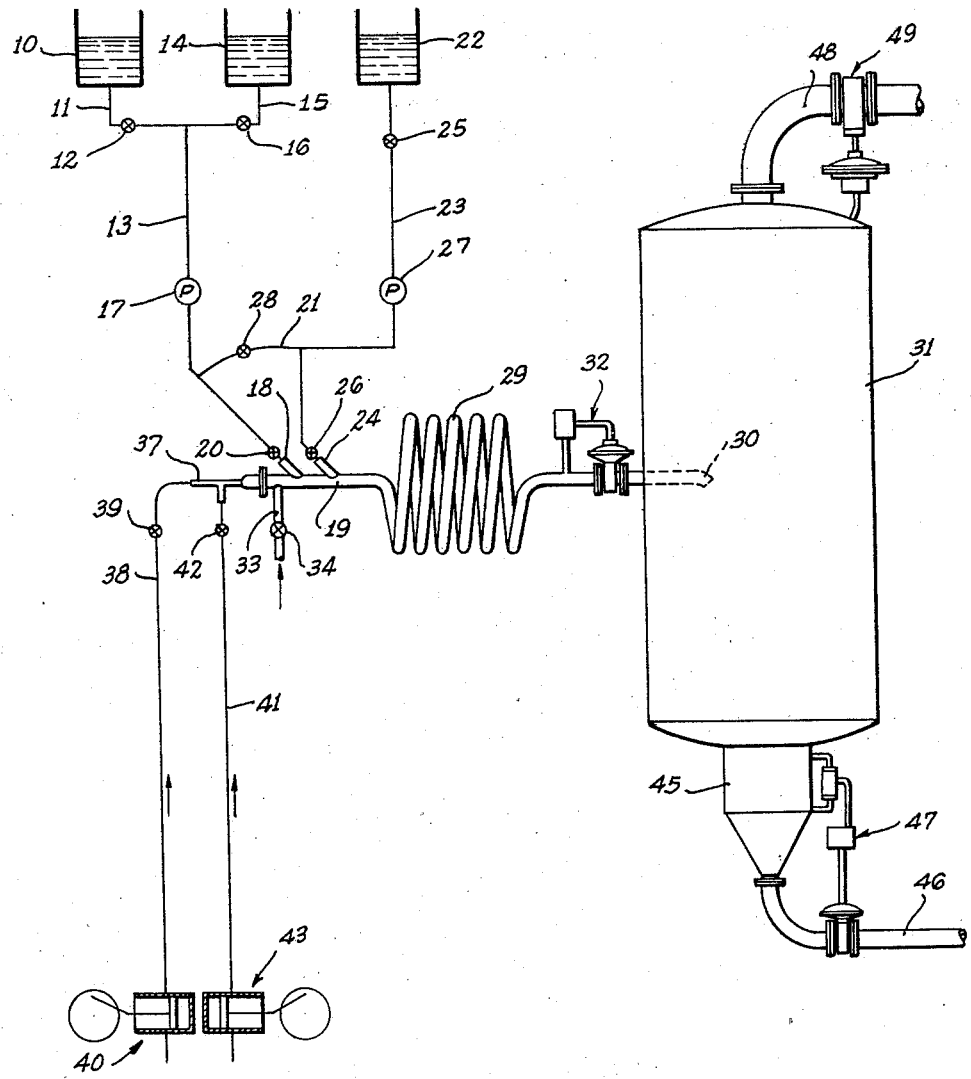
INVENTOR
ROBERT T. COLLIER
JOHN G. CARRIERE
BY HARRIS, KIECH, FOSTER & HARRIS
FOR THE FIRM
ATTORNEYS Patented Feb. 10, 1948

2,435,710

UNITED STATES PATENT OFFICE 2,435,710

METHOD OF PRODUCING SULFUR DIOXIDE FROM WASTE SULFURIC ACID-HYDROCARBON CONTAINING MATERIAL

Robert T. Collier, Palos Verdes Estates, and John G. Carriere, Long Beach, Calif., assignors, by mesne assignments, to Union Oil Company of California, Los Angeles, Calif., a corporation of California Application April 28, 1945, Serial No. 590,942

10 Claims. (Cl. 23—177)

This invention relates primarily to the manufacture of sulfur dioxide from sulfuric acid-containing by-products derived in the petroleum refining art, such as, for example, alkylation acid and acid sludge. Secondarily, this invention relates to the recovery of the hydrocarbons in a liquid form.

Sulfuric acid has long been used in the petroleum refining industry for the chemical treatment of petroleum distillates, such as gasoline, to refine and remove undesired impurities therefrom. The sulfuric acid in such treatments normally dissolves or reacts with some of the constituents and impurities of the distillate to form what is commonly known in the industry as "acid sludge," which is normally a relatively viscous, tarry substance containing or having intimately mixed therewith considerable quantities of the acid. Such acid sludge is separated from the treated gasoline by conventional processes to permit the gasoline, freed thereof, to be used or further treated, but use or disposal of such resulting by-product acid sludge has always presented a troublesome problem up to the refining industry, as it is difficult to handle, obnoxious, and contains a substantial percentage of sulfuric acid.

Sulfuric acid is also used extensively in the petroleum refining industry in the manufacture of gasoline by the so-called alkylation process, in which the acid combines with constituents of the distillate and deteriorates to form what is known as "alkylation acid," which, like acid sludge, contains tarry substances, but to a lesser degree than in the case of acid sludge. Such alkylation acid, while containing the greater proportion of the original acid, is usually unfit for further use in such process because of its inadequate concentration.

Such spent alkylation acids and acid sludges, hereinafter referred to as "charging stock," have been considered by the petroleum industry and also by the chemical industry as potential sources for the manufacture of sulfur dioxide to be in turn converted into fresh, commercially usable sulfuric acid. A large variety of methods for attaining this result have been suggested in the art, and several have been in widespread commercial use. One such method now in commercial use includes the mixing of acid sludge and alkylation acid with large quantities of relatively cold (200° F.) granular petroleum coke and then subjecting this charge to a sufficiently high temperature for a sufficient time to decompose the sulfuric acid therein to form sulfur dioxide and at the same time to reduce the hydrocarbons therein to solid coke. To achieve this purpose, large quantities of solids, such as heated coke, have been circulated as carriers for the charging stock through suitable mixers or kilns in which the charging stock is mixed therewith, to decompose the sulfuric acid and to form coke from the hydrocarbons thereof. It is normally necessary to mix a relatively small amount of charging stock with a relatively large amount of coke to secure a free flowing mixture and to subject it to the temperatures necessary to decompose the acid and to form coke, it being a usual practice to mix twenty or more parts by weight of the coke with one part of acid sludge and alkylation acid. This, as will be appreciated, requires the mechanical handling of extremely high tonnages of coke per day, with attendant high costs and mechanical difficulties with the handling equipment. It also necessitates constant mechanical agitation of the mixture of coke and charging stock during the heat treatment to prevent the mixture from balling up or sticking to the walls of the mixer or kiln, which is a further disadvantage of such prior art method. Furthermore, in another such commonly used process it is necessary to heat the coke to a very high temperature (about 1600° F.) before it is conveyed into the mixer or kiln so as to provide sufficient heat to bring the charging stock therein to the decomposing temperature, and the mechanical handling of such coke at such elevated temperatures requires heavy and expensive equipment, which is a further disadvantage of such method. It is therefore a primary object of our present invention to provide a method and apparatus for treating such charging stock to produce sulfur dioxide, which process is continuous, but which does not involve the circulation of large quantities of coke or other solid heating medium.

In the practice of the above-described prior art method, difficulty is also experienced in obtaining an even control of the amount of heat applied uniformly to the charging stock, thus resulting in inefficient heat application. It is therefore a further object of our invention to provide a process and apparatus adapted to provide control of the amount of heat supplied to such a charging stock to decompose the sulfuric acid therein to produce sulfur dioxide.

The formation of sulfur dioxide from sulfuric acid at reasonably low temperatures requires the presence of one or more reducing agents. While some viscous acid sludges contain sufficient available reducing agents to insure substantially complete decomposition of sulfuric acid at temperatures in the neighborhood of 550° F., and to insure the formation of free sulfur dioxide, neither the lighter acid sludges nor spent alkylation acid contains sufficient of such available reducing agents to insure such sulfur dioxide formation at such temperature. Even utilizing viscous acid sludge which is rich in hydrocarbons, to secure such sulfur dioxide formation at such temperatures the treatment must be carried to a point at which all of the remaining non-gaseous hydrocarbons are coked. We have found that we can prevent such coking by insuring that the charging stock contains sufficient excess hydrocarbons to insure not only substantially complete sulfur dioxide formation at treating temperatures lower than those hitherto employed, but also to insure that sufficient excess hydrocarbons are present at the completion of the treatment to provide a liquid residue instead of the solid coke residue that results from the above-described conventional process. We accomplish this by adding to the charging stock sufficient excess hydrocarbons to insure such results, the excess hydrocarbons preferably being in the form of a flux oil such as, for example, gas oil. By the addition of such reducing agents, we can maintain the temperature of treatment as low as 450° F.

It is therefore a further object of the present invention to provide a method and apparatus for the formation of sulfur dioxide from such a charging stock in which the latter, together with an oxidizable element included therein, is treated at the minimum temperature required for decomposition of the acid in the charging stock, which method and apparatus can be operated under varying conditions of pressure, temperature, and proportions of materials fed not only to obtain the reduction of sulfur trioxide to sulfur dioxide, but also to bring about the formation of liquid hydrocarbons.

In such conventional process, the use of temperatures of 550° F. or higher result in substantial cracking of the hydrocarbon constituents of the charging stock to form substantial amounts of hydrocarbon gases of relatively low condensation point which dilute the sulfur dioxide formed and which are difficult and costly to remove from the sulfur dioxide. Such hydrocarbon gases resulting from this cracking are lost from the remaining coke produced by the process, and their heat value is for the most part wasted. It is therefore a further object of the present invention to provide a method and apparatus for the formation of sulfur dioxide from such charging stock, in which the charging stock is treated at or only slightly above the decomposition temperature of the sulfuric acid therein, so as to reduce undesirable cracking of the hydrocarbon constituents to a minimum.

In the practice of our process we utilize preferably a non-reactive stable condensable fluid, preferably heated steam, as a heating medium, mixing it directly with the charging stock to be treated, in order to raise the stock to the minimum temperature required to decompose substantially all of the sulfuric acid therein to produce sulfur dioxide and the desired by-products. By the use of such a heating medium, we derive a number of advantages, all of which are objects of the invention, including: (a) such a heating medium is economical to produce and handle and requires relatively inexpensive equipment therefor; (b) it provides means whereby the temperature and pressure of decomposition of the treated materials can be accurately and closely controlled in order to produce the desired results; (c) it is an excellent medium for conveying the treated materials through the decomposition zone at a velocity such that there is little, if any, tendency for the walls of the decomposition zone to coke or clog due to deposition thereon of solid hydrocarbons; (d) such a heating medium applies heat to the material treated internally so as to avoid excessively hot spots on the walls of the decomposition zone that normally result from external heat thereof in some conventional methods and which tend to produce undesirable cracking of the hydrocarbons and deposition of carbon or solid hydrocarbons on the walls of the decomposition zone; (e) it acts directly as an inhibitor of undesirable cracking of the heavier hydrocarbons in the material treated; (f) it may be readily condensed to separate it from the sulfur dioxide formed by our process to produce a resultant high concentration of sulfur dioxide; and (g) when so condensed, such heating medium can be readily separated from any liquid hydrocarbons produced by our process due to their widely different densities.

In the practice of our process, we pass the charging stock to be treated plus the added reducing agents, together with the condensable fluid heating medium, through a decomposition zone maintained at a temperature sufficiently high under the operating conditions of pressure to bring about the reduction of the sulfuric acid therein to produce sulfur dioxide, and then we discharge the resulting products into a separating chamber maintained at a temperature and pressure substantially lower than the temperature and pressure of the decomposition zone but above the temperature at which the heating medium condenses so as to condense or separate the major portion of the condensable hydrocarbons but to maintain the heating medium in a vaporous or gaseous state, which is a further object of this invention.

In the practice of the conventional process described above, it is necessary to subject the charging stock to the relatively high treating temperature for a relatively long period of time to reduce the hydrocarbons therein to coke. Such required prolongation of the heating period increases substantially the amount of undesirable cracking of the hydrocarbons resulting in the formation of solid coke in such conventional process. Since in our present process we do not desire to produce coke, we may therefore reduce substantially the treating period during which the raw stock is subjected to the treating temperature. It is therefore another object of our invention to practice such a process so that the charging stock is maintained in the decomposition zone for a sufficient period of time to permit substantially complete decomposition of the sulfuric acid therein, but for a period of time sufficiently brief to prevent any substantial undesirable cracking of the hydrocarbons in the charging stock.

Still another object of the invention is to provide an apparatus adapted to carry out our process as described above which includes a decomposition zone preferably in the form of a coiled tubing, such coiled tubing being adapted to provide thorough agitation and mixing of the materials passing therethrough so as to uniformly distribute therethrough the heat provided by the heating medium and take full advantage of the heat produced by the oxidation of the oxidizable elements in the mixture.

A further object of our invention is to provide such a process in which the readily condensable and liquid hydrocarbons discharged from the decomposing zone can be collected as a liquid. We prefer to accomplish this, in part, by diluting the charging stock to be treated before it is introduced into the decomposing zone, or therein, with a relatively light petroleum product, such as, for example, gas oil, having a boiling point above the temperature at which the separating chamber is maintained, which not only supplies added reducing agents but also acts as a flux so as to maintain and collect in a liquid form the hydrocarbons from the treated material.

In a modification of our process, hydrogen sulfide mixed with air is burned in a burner leading to the decomposing zone so as to form additional sulfur dioxide which mixes with and is separated together with that formed by the decomposition of sulfuric acid in the zone, thus increasing the total yield of sulfur dioxide, supplying heat to the decomposing zone, increasing the volume and velocity of the gases passing therethrough, and utilizing hydrogen sulfide which might otherwise be wasted, all of which are additional objects of the invention.

Other objects and advantages will appear from the following specification and the drawing, which is for illustrative purposes only, and in which the figure is a schematic flow diagram of our preferred apparatus for producing sulfur dioxide and collecting the condensable hydrocarbons in the separating chamber in liquid form.

Referring to the drawing, we show an alkylation acid feed tank 10 connected by a pipe 11, having a flow control valve 12 therein, to a feed pipe 13. Also connected to the feed pipe 13 is an acid sludge feed tank 14 which is connected thereto by a pipe 15 having a control valve 16 therein. The feed pipe 13 is provided with a conventional pump 17, and is connected by means of a suitable discharge nozzle 18 with a decomposer tube 19, the feed pipe being provided with a control valve 20, and the pump 17 being adapted to force fluid under pressure from the tank through the feed pipe into the decomposer tube. There is also provided a flux oil feed tank 22 connected by a feed pipe 23 through a discharge nozzle 24 with the decomposer tube 19, the feed pipe 23 being provided with control valves 25 and 26 and a pump 27, of conventional design, adapted to pump fluid from the feed tank 22 to the decomposer tube 19. Flux oil feed pipe 23 is connected directly with the feed pipe 13 by piping 21 provided with a valve 28 which will permit, if desired, flux oil to be admitted into the acid feed line 13 so that both the acid feed and the flux oil can enter the decomposer tube 19 premixed through the nozzle 18 if desired.

The decomposer tube 19 provides a decomposing zone therein, including a helically coiled portion 29, and has a suitable discharge nozzle 30 disposed in a closed separating chamber 31. Disposed in the decomposer tube 19 is a conventional automatic pressure control valve 32 which is adapted to maintain a predetermined uniform pressure in the decomposer tube. Connected to the other end of the decomposer tube is a steam inlet pipe 33, having a control valve 34 therein, which leads to the decomposer tube from a suitable source of steam or other heating medium (not shown). Also connected to the same end of the decomposer tube 19 is a conventional burner 37 adapted to burn hydrogen sulfide in the decomposer tube and having connected thereto a hydrogen sulfide inlet pipe 38 having a suitable flow control valve 39 therein and leading to a compressor 40 adapted to compress hydrogen sulfide gas supplied to it from a suitable source (not shown). Also connected to the burner 37 is an air inlet pipe 41 having a flow control valve 42 therein and leading to a compressor 43 adapted to supply compressed air to the burner 37 should its use be desired. In the event that it is desired that hydrogen sulfide be used as a reducing agent for sulfur trioxide formed in the decomposing zone, the valve 42 is closed to exclude the admission of any air to the decomposing tube, and the burner 37 merely becomes an inlet to the decomposing tube for hydrogen sulfide.

Since liquid hydrocarbons are desired as a residue, the separating chamber 31 is provided with a collection chamber 45 at the lower end thereof having a liquid outlet pipe 46 connected thereto, there being an automatic liquid level control valve 47 connected to the collection chamber and the outlet pipe so as to maintain a predetermined liquid level in the collection chamber and discharge an excess thereof through the outlet pipe. Connected to the top of the separating chamber 31 is a gas outlet pipe 48 having an automatic pressure control valve 49 therein which is adapted to maintain a predetermined fluid pressure in the separating chamber 31.

In the preferred operation of the apparatus, the feed tanks 10 and 14 are respectively filled with and maintained full of a charging stock such as spent alkylation acid and acid sludge, and the feed tank 22 is filled with and maintained full of a flux oil described more specifically hereinafter. To commence operation, the valves 20 and 26 are closed, the valve 49 is opened, and the control valve 34 is opened, the latter admitting steam or other fluid heating medium, as more specifically described hereinafter, to the decomposer tube 19, through which it flows to the separating chamber 31 and thence through the gas outlet pipe 48. The automatic pressure control valve 32 is adjusted so as to maintain a fluid pressure in the decomposer tube 19 of approximately 100 pounds per square inch absolute, or in excess thereof, and the automatic pressure control valve 49 is adjusted so as to maintain in the separating chamber 31 a pressure of approximately 15 pounds per square inch absolute, or somewhat thereabove.

Flow of the heat transfer medium through the decomposer tube 19 and the separating chamber 31 is continued until the decomposer tube is raised to a temperature of 450° F. if no additional reducing agent is added, and the temperature of the separating chamber is raised to between 300° F. and 350° F. When these temperatures are attained in the system, the flow control valves 12, 16, and 25 are opened varying amounts to provide a mixture of spent alkylation acid and acid sludge from tanks 10 and 14 respectively and flux oil from tank 22. The feed pumps 17 and 27 for the desired charge are operated at pressures higher than exist in the decomposer tube 19 so as to prevent a reverse flow of the vapors from the decomposer tube and to insure satisfactory feed to the decomposer tube. The proportions of the ingredients of the charging stock are arranged and balanced by adjustment of the valves 12, 16, and 25 so that the hydrocarbons in the alkylation acid and acid sludge plus the hydrocarbons in the flux oil not only furnish a sufficient available reduction agent to react chemically with the available oxygen from the sulfur trioxide to be formed from the decomposition of the sulfuric acid, but are also sufficient to cause the resultant residue when discharged into the separating chamber 31 and condensed therein to precipitate in liquid form and be drawn off therefrom as such. The control valve 34 is gradually adjusted to admit additional steam to compensate for the heat absorption by the materials to be treated. The reduction of sulfur trioxide by the reducing agent from the hydrocarbons of the charging stock also liberates heat, which must be compensated for by further adjustment of the valve 34 to maintain the optimum conditions of temperature in the decomposer tube, and by predetermined adjustment of the automatic pressure control valve 32 optimum conditions of pressure are maintained in the decomposer tube.

The fluid heating medium, such as steam, completely mixes with and atomizes the charging stock and carries it through the decomposer tube 19 at high velocity to discharge the products thereof through the nozzle 30 into the separating chamber 31. Passage of this mixture through the helically coiled portion 29 of the decomposer tube 19 thoroughly agitates and mixes the mixture, insuring that every part of the materials being treated is subject to the direct controlled heating action of the steam and the heat of reaction. The combined length of the decomposer tube 19 and coil 29 is sufficient to permit time and opportunity for complete dissociation of the sulfuric acid to form sulfur trioxide and the complete reduction of sulfur trioxide to sulfur dioxide. The action of the heating medium is to not only propel and thoroughly atomize the charging stock being treated through the decomposer tube 19, but also, and equally important, to raise the temperature of such stock to, or in excess of, a controlled temperature necessary for the decomposition of the sulfuric acid therein to produce sulfur dioxide and water vapor. Since the velocity of the charging stock through the decomposer tube 19 is relatively high, there is little or no tendency for the viscous hydrocarbons therein to adhere to and foul the inner walls of the decomposer tube. Consequently, a decomposer tube and coil of the proper internal diameter must be employed to assure the minimum necessary velocity to keep the tube and coil free from fouling and maintain the throughout capacity desired.

At least a portion of the hydrocarbons in the charging stock have boiling points below the treating temperature in the decomposer tube 19, and all such portion is vaporized during its passage through the tube. Furthermore, at the treating temperature in the decomposer tube a small portion of the hydrocarbon would normally be cracked or decomposed to produce carbon, heavy hydrocarbons, gaseous hydrocarbons, and some hydrogen, the latter combining with the excess oxygen produced by the reduction of sulfur trioxide to form additional water vapor. It is to be noted, however, that when liquid hydrocarbons are desired as a by-product, the decomposition or cracking of the hydrocarbons in the tube 19 is undesirable and is inhibited so far as possible. We accomplish this inhibiting by: (a) admitting to the decomposer tube a liquid hydrocarbon such as flux oil providing additional reducing agents, which permits the use of a treating temperature in the decomposer tube 19 which is relatively low (as low as 450° F.); (b) maintaining a relatively high fluid pressure in the decomposer tube, i. e., a pressure in excess of 100 pounds per square inch; and (c) preferably using superheated steam as the heat transfer medium, since the presence of steam characteristically tends to inhibit the cracking of hydrocarbons.

The mixture from the decomposer tube 19 is discharged through the nozzle 30 into the separating chamber 31. This mixture includes hydrocarbons in the liquid, vapor, and gaseous states, a substantial volume of sulfur dioxide, and water vapor. Since the separating chamber 31 is maintained at a temperature of approximately 300° F., and at a pressure below 50 pounds per square inch absolute, and preferably at about 15 pounds per square inch absolute, the velocity of the mixture discharged thereinto through the nozzle 30 is substantially reduced, and all liquid hydrocarbons therein, even though finely atomized, separate by gravity and collect in the collection chamber 45. All of the vaporized hydrocarbons having boiling points above the temperature of the chamber 31 promptly condense to a liquid state and likewise collect in the collection chamber 45, which preferably includes the bulk of the flux oil supplied from the flux oil feed tank 22. In this connection, it is to be noted that we prefer to use as a flux oil a relatively light petroleum hydrocarbon oil, such as a gas oil, having a boiling point above the temperature at which the separating chamber 31 is maintained, so that if it is vaporized during its passage through the decomposer tube 19 it will readily condense when discharged into the separating chamber and also have the maximum cutting or fluxing action on the heavier hydrocarbons produced from the charging stock. A flux oil is preferably selected for use in the process such that at the temperatures and pressure in the decomposer tube 19 it will not materially decompose or be substantially cracked during its passage therethrough. Thus, the major portion of the hydrocarbons passing through the decomposer tube 19 are collected as a liquid in the separating chamber 31 and are drawn therefrom as such through the liquid outlet pipe 46, which is an important feature of the invention, as such liquid hydrocarbons may be conveniently pumped and handled and can be used as a fuel oil or for other purposes as desired, there being little if any solid material formed by our process when operated in this fashion. The heat of condensation of such hydrocarbons, together with the higher initial temperature thereof, aids in maintaining the temperature of the separating chamber at the proper level (300° F. to 350° F.).

As the separating chamber 31 is maintained at a temperature of approximately 300° F., the steam used as a heating medium and the water vapor formed in the decomposer tube 19 are maintained in the vapor phase in the separating chamber and do not condense out therein. Such vapors, together with remaining vaporous and gaseous hydrocarbons, the sulfur dioxide, and other gases, are conveyed from the separating chamber 31 through the gas outlet pipe 48 to suitable conventional purification equipment (not shown) adapted to separate the components thereof. As will be apparent, the resulting sulfur dioxide may be subsequently treated in a conventional contact unit (not shown) to produce fresh sulfuric acid.

While we prefer to use superheated steam as a heating medium in the practice of our process, due to its many advantages as pointed out hereinabove, it is to be understood that we do not desire to be limited thereto, as other non-reactive, stable, condensable fluids may be substituted therefor without departing from the spirit of our invention. It is to be noted, however, that the heating medium employed should have a boiling point below the temperature at which the separation chamber 31 is maintained, so as to keep it in the vapor or gaseous phase while in the separating chamber so that it may be conveyed therefrom through the gas outlet pipe 48. Obviously, if the heating medium has a boiling point above the temperature at which the separating chamber 31 is maintained, or, stated conversely, if the temperature of the separating chamber 31 is maintained below the boiling point of the heating medium, the heating medium will also condense out in the separating chamber. If steam is used as such heating medium and is condensed in the separating chamber 31, the resulting water would tend to emulsify with the liquid hydrocarbons therein, which would require subsequent dehydration to remove the water therefrom, all of which would be undesirable.

Where substantial quantities of hydrogen sulfide are readily available, as is common in many oil refineries, it is frequently desirable to utilize hydrogen sulfide as an added feature in the above-described practice of our process. In the use of hydrogen sulfide in the practice of the process, compressed hydrogen sulfide can be injected directly into the decomposer tube through the hydrogen sulfide inlet 38 and thereby acts as a further reducing agent to form sulfur dioxide, or, on the other hand, if additional heat is required in the decomposer tube over and above that which is supplied by the heating medium and by the reaction of hydrocarbons of the charging stock during treatment, the hydrogen sulfide together with compressed air can be supplied to the burner 37 through the air inlet pipe 41 and the hydrogen sulfide and air ignited and burned therein. The products of this combustion provide additional sulfur dioxide and water vapor and also supply heat to the decomposer tube 19. This increases the total sulfur dioxide yield of the process, provides additional heat to the decomposer tube 19 to aid in the decomposition of the sulfuric acid therein, and provides an additional volume of gas assisting the movement of the hydrocarbons through the decomposer tube. In this modified practice of the process, of course, the steam control valve 34 would be partially closed to reduce the amount of steam admitted to the decomposer tube 19, so that the treating temperature and pressure maintained in the decomposer tube are held at an optimum.

It will thus be understood that we have provided a continuous process of making sulfur dioxide from acid sludge or spent alkylation acid, or other sulfuric acid-containing by-products, or combinations thereof which contain varying proportions of hydrocarbons, and an apparatus therefor which is relatively economical to install and operate and which provides a high yield of sulfur dioxide and recovers the bulk of the hydrocarbons from the sludge and spent acid in a liquid form. It will also be understood that the temperatures and pressures utilized in the decomposer tube 19 and the separating chamber 31 are directly related to each other as well as to the nature of the materials treated by the process and the reducing agents admitted therewith, and further that changes in the hydrocarbon content of the alkylation acid or acid sludge may require changes not only in the quantity and kind of the flux oil and reducing agents used, but also in the temperatures and pressures used in the decomposer tube and separating chamber. Likewise, it will be appreciated that the characteristics of the heat transfer medium and the flux oil selected for use in the process are likewise directly related to the temperatures and pressures maintained in the decomposer tube 19 and the separating chamber 31, the selection thereof being within the knowledge of those skilled in the art. Consequently, we do not desire to be limited to the exact range of temperatures and pressures and materials described hereinabove, but desire to be afforded the full scope of the following claims.

We claim as our invention:

1. The process of producing sulfur dioxide from waste sulfuric acid produced in treatment of hydrocarbons and which contains substantial amounts of hydrocarbon material, which comprises introducing such waste acid into one end of an elongated decomposing zone of restricted cross section, introducing into the same end of said zone a heating gas at a sufficient temperature and in sufficient quantity to heat said acid above the decomposition point of the acid but below the cracking temperature of the hydrocarbon material and below the vaporization point of a substantial portion of said hydrocarbons, waste acid and heating gas being introduced at such pressure and quantity as to cause flow through the zone at such velocity that decomposition of carbonaceous materials on the walls of the zone is substantially avoided, maintaining the mixture in flow through said zone at the decomposition temperature of the acid until the production of sulfur dioxide is effected, discharging the mixture into a separating zone and removing sulfur dioxide as overhead and liquid hydrocarbons therefrom.

2. A process according to claim 1 in which the waste sulfuric acid is spent alkylation acid, and is mixed with a hydrocarbon flux oil reducing agent prior to introduction into said decomposing zone.

3. A process according to claim 1 in which the waste sulfuric acid is introduced substantially in the liquid phase and is atomized by the heating gas.

4. The process of producing sulfur dioxide from waste sulfuric acid produced in treatment of hydrocarbons and which contains substantial amounts of hydrocarbon material, which comprises introducing such waste acid into one end of an elongated decomposing zone of restricted cross-section, introducing into the same end of said zone a heating gas at a sufficient temperature and in sufficient quantity to heat said acid to a temperature between about 450° F. and 550° F. and to thoroughly atomize and propel said acid through said zone at such a velocity that deposition of carbonaceous materials on the walls of the zone is substantially avoided, maintaining the mixture in flow through said zone at said temperature and a pressure in excess of 100 pounds per square inch for a sufficient time to permit substantially complete decomposition of the sulfuric acid therein without permitting substantial cracking of the hydrocarbons in the acid, discharging the mixture into a separating zone maintained at a lower temperature and pressure, and removing a gaseous fraction comprising sulfur dioxide and a liquid residue comprising hydrocarbons from said separating zone.

5. A process according to claim 4 in which waste sulfuric acid is mixed with a hydrocarbon flux oil reducing agent prior to introduction into the decomposing zone.

6. A process according to claim 5 in which the flux oil is a petroleum gas oil which is not substantially cracked in the decomposing zone and is substantially completely condensed in the separating zone at a temperature of 300° F. to 350° F.

7. A process according to claim 4 in which the heating gas is steam.

8. In a process producing sulfur dioxide from a material containing hydrocarbons and sulfuric acid, the steps of: mixing hydrogen sulfide with said material; conveying said material and said hydrogen sulfide through a tube defining a decomposing zone; and supplying a fluid heating medium to said decomposing zone so that the walls of said zone are at a temperature not greater than the temperature in said zone and so that said material is heated therein to a temperature at which said sulfuric acid is decomposed to produce sulfur dioxide, said hydrogen sulfide acting as a reducing agent in such decomposition.

9. In a process for treating a material containing hydrocarbons and sulfuric acid, the steps of: introducing said material into a decomposing zone; mixing a heating fluid with said material in said decomposing zone so that said material is heated therein to a temperature at which said sulfuric acid decomposes to produce sulfur dioxide; said heating fluid assisting in conveying said material through said zone; burning hydrogen sulfide so as to produce sulfur dioxide; and introducing the products of combustion of said hydrogen sulfide into said zone so as to furnish additional heat to said zone and to assist in conveying said material through said zone.

10. In a process for treating a material containing hydrocarbons and sulfuric acid, the steps of: mixing hydrogen sulfide with said material; introducing said material and said hydrogen sulfide into a decomposing zone; supplying a fluid heating medium to said zone so as to heat said material therein to a temperature at which said sulfuric acid is decomposed to produce sulfur dioxide, said hydrogen sulfide acting as a reducing agent in said decomposition.

ROBERT T. COLLIER.
JOHN G. CARRIERE.

REFERENCES CITED

The following references are of record in the file of this patent:

UNITED STATES PATENTS

| Number | Name | Date |
| --- | --- | --- |
| 1,143,132 | Peacock | June 15, 1915 |
| 1,838,030 | Mann, Jr., et al. | Dec. 22, 1931 |
| 1,862,060 | Moser et al. | June 7, 1932 |
| 2,014,556 | Chewing et al. | Sept. 17, 1935 |
| 2,021,725 | Hechenbleikner | Nov. 19, 1935 |
| 2,052,544 | Bartholomew | Sept. 1, 1936 |
| 2,066,562 | Fowler | Jan. 5, 1937 |
| 2,070,256 | Carter et al. | Feb. 9, 1937 |
| 2,078,882 | Savage | Apr. 27, 1937 |
| 2,091,943 | Gilchrist et al. | Aug. 31, 1937 |
| 2,155,200 | Merriam | Apr. 18, 1939 |
| 2,207,610 | Chappell | July 9, 1940 |
| 2,288,729 | Merriam et al. | July 7, 1942 |

Certificate of Correction

Patent No. 2,435,710.  February 10, 1948.

ROBERT T. COLLIER ET AL.

It is hereby certified that errors appear in the printed specification of the above numbered patent requiring correction as follows: Column 1, line 24, after the word "problem" strike out "up"; column 10, line 31, for "decomposition" read *deposition*; column 12, line 26, list of references cited, under "UNITED STATES PATENTS" for "2,014,556   Chewing et al_____Sept. 17, 1935"

read 2,014,556   Chewning et al_____Sept. 17, 1935 and that the said Letters Patent should be read with these corrections therein that the same may conform to the record of the case in the Patent Office.

Signed and sealed this 4th day of May, A. D. 1948.

[SEAL]

THOMAS F. MURPHY,
*Assistant Commissioner of Patents.*